United States Patent [19]

Kitamura et al.

[11] Patent Number: 5,095,059
[45] Date of Patent: Mar. 10, 1992

[54] OILED-FACE ADHERABLE, HOT-MELT ADHESIVE COMPOSITION AND A NON-SLIP PROCESSING METHOD OF METAL SCAFFOLDING BOARD

[75] Inventors: Tadashi Kitamura; Kiyoto Doi; Eiichi Kawasaki; Kenichi Yashiro, all of Kanagawa, Japan

[73] Assignee: Mitsui Toatsu Chemicals, Inc., Tokyo, Japan

[21] Appl. No.: 675,611

[22] Filed: Mar. 27, 1991

[30] Foreign Application Priority Data

Mar. 28, 1990 [JP] Japan ................................. 2-76578

[51] Int. Cl.$^5$ ...................... C08L 93/04; C08C 19/24; C08F 8/40; C08F 275/00
[52] U.S. Cl. ..................... 524/272; 525/287; 525/329.8; 525/330.4; 525/340; 524/270
[58] Field of Search ................ 524/270, 272; 525/287, 525/329.8, 330.4, 340

[56] References Cited

U.S. PATENT DOCUMENTS 2,823,140  2/1958  Lowell ................................. 525/340
3,155,744  11/1964 Forrestal et al. ..................... 525/287
4,618,640  1/1986  Tsuchida et al. ..................... 524/270

Primary Examiner—Paul R. Michl
Assistant Examiner—Peter Szekely
Attorney, Agent, or Firm—Millen, White & Zelano

[57] ABSTRACT

The invention provides oiled-face adherable, hot-melt adhesive composition which has constitutive components consisting of thermoplastic resin such as ethylene-acrylate ester resin, tacky resin such as rosin ester derivative and waxes such as paraffin wax and/or plasticizer such as naphthene oil, and also contains modified resin components obtained by introducing into the molecular chains of these components a phosphoric acid group or, if desired, a carboxyl or its anhydride group, for example, by grafting 2-hydroxy-3-(meth)acryloxypropyl phosphate.

By providing the composition, adhesion and seal of metals with difficulty adhesive plastics are improved and a non-slip processing method of face-oiled metal scaffolding boards can be accomplished.

11 Claims, No Drawings

OILED-FACE ADHERABLE, HOT-MELT ADHESIVE COMPOSITION AND A NON-SLIP PROCESSING METHOD OF METAL SCAFFOLDING BOARD

BACKGROUND OF THE INVENTION

1. a) Field of the Invention

The present invention relates to a hot-melt type adhesive composition which is suitable for adhesion and sealing to metals without pretreatment and a non-slip processing method of metal scaffolding board.

More particularly, the invention relates to the hot-melt adhesive composition which can be preferably used for adhesion of plastics having difficulty on adhesion and sealing to metals, is excellent in adhesion properties to oiled surface of metals, resistance to water and corrosion, and is capable of conducting instant adhesion or short time adhesion. And the invention relates to the non-slip processing method of metal scaffolding board by using oiled-face adherable hot-melt adhesive without pretreatment.

2. b) Description of the Invention

A hot-melt adhesive composition having 100% solid content has conventionally been used in various fields, well known on its usefulness in industry, and employed in a rapidly increasing amount due to instant adhesion characteristic and freedom pollution.

Conventional arts for adhesives exhibiting adhesion properties to oiled surface have been known as thermosetting type adhesives, for example, an epoxy adhesive, solvent type adhesive and a two component acrylic adhesive. These adhesives substantially have problems of toxicity, odor and poor workability and hence conversion to a solventless type hot-melt adhesive composition is required.

However, a hot-melt adhesive which exhibits good adhesion properties to both the oiled surface of metals and non-polar plastics has not yet been found.

In the field of automotive assembly, particularly reliability in adhesion is regarded as important for the adhesion processing of steel plates or adhesion of various plastic parts for rigging. A liquid epoxy adhesive capable of oiled-face adhesion is used for the adhesion of face-oiled steel plates in a door hemming portion.

Hot-melt adhesives have recently been focused attention again for the adhesion of various plastic parts for rigging in view of pollution-free properties and increase in productivity. However, adhesives which can exhibit satisfactory adhesion properties to face-oiled materials have not yet been found.

In the field of building materials, for example, hot-melt adhesive is also coated on metallic scaffold plates in order to prevent slip. However, conventional adhesives can be applied to degreased materials alone and require complex coating steps. Development of hot-melt adhesive composition capable of adhering to oiled surface is strongly desired in view of pollution-free application and energy saving.

A hot-melt adhesive composition primarily composed of butyl rubber has been disclosed in Japanese Patent Publication 92379 (1985) as a pollution-free, instant adhesive or an adhere-sealing agent which is most suitable for plastics of difficult adhesion. Some of other hot-melt adhesive compositions have been known to contain thermoplastic macro molecule such as styreneethylene-butylene-styrene resin, styrene-butadienesstyrene resin, and styrene-isoprene-styrene resin as a base polymer and other components such as tackifiers, waxes and plasticizers.

For adhesion of woods and papers in particular, many hot-melt adhesive compositions containing ethylenevinyl acetate resin as thermoplastic macro molecule have been known. On the other hand, disclosed arts for hot-melt adhesive compositions capable of adhering metals include polyamide base, polyester base, ethylene-vinyl acetate base and rubber base hot-melt compositions. Any of these adhesive compositions, however, have exhibited adhesion reliability only on a clean surface of metals. Oiled metal surface having build-up of cutting oil, rubricant or rust proof oil can not at all or scarcely exhibit adhesive force as such by the conventional hot-melt adhesive composition.

Consequently, in the case of adhering metals by using conventionally known hot-melt adhesive compositions, it has been required, for example, to previously conduct degreasing treatment, or to carry out flame treatment for degreasing and preheating, or to use a specific primer.

As mentioned above, there are following four requirements in the market.

The first requirement is to provide a hot-melt adhesive composition having excellent adhesion to oiled surface without pretreatment by utilizing instant adhesion properties of the hot-melt adhesive.

The second requirement is to provide reliability for adhesion to, for example, polypropylene, acrylics, polyethylene, polycarbonate, acrylonitrile-styrene resin, acrylonitrile-butadiene-styrene resin and other plastics which are difficult to adhere.

The third requirement is to provide the adherend with water resistance and environmental compatibility.

The fourth requirement relates to the above third requirement, and is to provide rust prevention for metals, that is, to provide a hot-melt adhesive composition having high rust-preventive effect after adhesion.

SUMMARY OF THE INVENTION

The object of the invention is to obtain a hot-melt adhesive composition which is, in adhesion of metallic materials, suitable for carrying out adhesion without pretreatment under high reliability and capable of conducting pollution-free and instant adhesion. That is, the object is to provide a composition which can instantly adhere the metal surface stained with machine oil, lubricant, rust preventing oil, grinding oil, processing oil and other residual oils used for machining treatment of the metal surface.

Another object of the present invention is to provide a hot-melt adhesive composition which exhibits reliability on adhesion-sealing, water resistance and rust prevention of metals for a long period.

Another object of the present invention is to provide a non-slip processing method of a metal scaffolding board by using oiled-face adherable hot melt adhesive composition.

As a result of an intensive research in order to solve the above problems, the present inventors have found that in a hot-melt adhesive composition containing a required component composed of a thermoplastic base polymer and a tackifier and an optional component composed of a wax and a plasticizer, the above object can be accomplished by providing a modified resin obtained by introducing a phosphoric acid group into a molecular chain in one of the above constitutive components. Thus the present invention has been completed.

That is, the aspect of the present invention is an oiled-face adherable, hot-melt adhesive composition having constitutive components comprising of a thermoplastic base polymer, tackifier and one or more of additive selected from the group consisting of waxes and plasticizers, one or more of molecular chain in said constitutive components comprising a modified resin component obtained by introducing into a molecular chain a functional group represented by the formula (I):

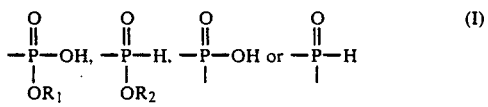

wherein $R_1$ is a hydrogen atom, an alkyl group having from 1 to 8 carbon atoms,

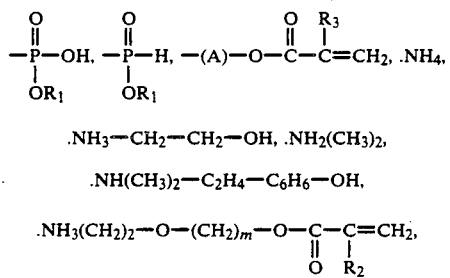

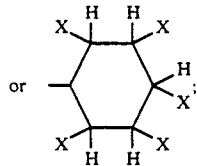

$R_2$ is a hydrogen atom, methyl group, $\cdot NH_4$ or $\cdot NH_3-CH_2-CH_2OH$; $R_3$ is a hydrogen atom or a methyl group; A is

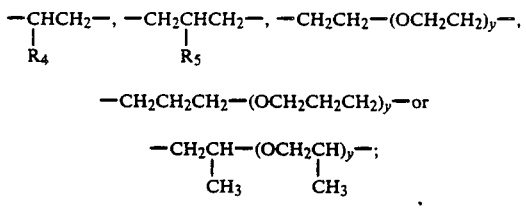

m is an integer of 2 or 3; $R_4$ is a hydrogen atom or a methyl group; $R_5$ is a hydrogen atom, methyl group, hydroxymethyl group or a chloromethyl group; X is $-P-(OH)_2$; and Y is an integer of from 1 to 15.

DETAILED DESCRIPTION OF THE INVENTION

The oiled-face adherable, hot-melt resin composition of the present invention described above has preferably following embodiments.

That is, the composition of the invention is a hot-melt adhesive having constitutive components comprised of at least a thermoplastic base polymer and a tackifier and optionally a wax and/or a plasticizer. Preferred composition comprises in a molecular chain of at least one of the constitutive components a phosphoric acid group or a half amine salt group which are represented by the above formula (I) and further comprises one or more of functional groups selected from —COOH and

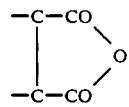

which are introduced into the same or different molecular chain.

A more preferred composition comprises a modified resin component obtained by grafting unsaturated carboxylic acid or its anhydride in an amount of 5% by weight or less. A more preferred composition comprises, as the tackifier, hydrogenated rosin, a hydrogenated rosin ester derivative or polymerized rosin in the range of from 1 to 40% by weight. A more preferred composition comprises a modified resin component obtained by grafting from 0.1 to 20 parts by weight of a compound selected from the group consisting of 2-hydroxy-3-(meth)acryloxypropyl phosphate, 2-hydroxy-3-(meth)acryloxyethyl phosphate and their half amine salts into 100 parts by weight of the constitutive components.

A more preferred composition comprises a modified resin component obtained by reacting a resin component having a hydroxyl group with an agent selected from the group consisting of phosphorus pentoxide, phosphorus trichloride and phosphorus oxychloride and hdyrolyzing the resultant intermediate.

A more preferred composition comprises a modified resin component obtained by introducing a glycidyl group into the constitutive components and successively reacting the resultant intermediate with phosphorous acid or phosphoric acid.

A more preferred composition comprises one or more of thermoplastic resin having a molecular weight in the range of from 20,000 to 1,000,000 and selected from the group consisting of styrene-ethylene-butylene-styrene resin, styrene-ethylene-butylene resin, styrene-ethylene-propylene-styrene resin, ethylenepropylene resin and ethylene acrylate ester resin; and the thermoplastic resin previously comprises both or either of the modified resin components obtained by (A) grafting from 1 to 20 parts by weight of a compound selected from the group consisting of 2-hydroxy-3-(meth)acryloxypropyl phosphate, 2-hydroxy-3-(meth)acryloxyethyl phosphate and an half amine salt of these phosphates upon 100 parts by weight of the thermoplastic resin, and (B) grafting from 0.1 to 5 parts by weight of a monomer selected from the group consisting of maleic anhydride, acrylic acid and methacrylic acid.

The most preferred composition is a hot-melt adhesive composition having constitutive components composed of:

(a) from 5 to 80% by weight of one or more of thermoplastic base polymer having a molecular weight of from 20,000 to 1,000,000 and selected from the group consisting of butyl rubber, polyisobutylene, styrene-butadienestyrene resin, styrene-isoprene-styrene resin, styreneethylene-butylene-styrene resin, styrene-ethylenebutylene resin, styrene-ethylene-propylene-styrene resin, ethylene-propylene resin, ethylene-vinyl acetate resin and ethylene-acrylate ester resin, (b) from 20 to 60% by weight of one or more of tackifier selected from the group consisting of a hydrogenated terpene base resin, hydrogenated petroleum resin, hydrogenated alicyclic base petroleum resin and a rosin ester derivative resin, (c) from 1 to 20% by weight of one or more of wax selected from the group consisting of paraffin base wax, polyethylene base wax, polypropylene base wax and modified wax thereof, and (d) from 0 to 30% by weight of one or more of plasticizer selected from the group consisting of liquid polybutene, liquid hydrogenated polyisprene and atactic polypropylene; and these constitutive components comprise a modified resin component obtained by grafting from 1 to 20 parts by weight of 2-hydroxy-3-(meth)acryloxypropyl phosphate or 2-hydroxy-3-(meth)acryloxyethyl phosphate into 100 parts by weight of the sum of the thermoplastic base polymer, tackifier and one or more of other constitutive components.

Further, the present invention is a non-slip processing method of a metal scaffolding board comprising conducting hot-melt coating of the above oiled-face adherable, hot-melt adhesive composition on the back surface of the metal scaffolding board without surface treatment to form a non-slip film composed of one or a plurality of layer having a width of from 5 to 30 mm.

The preferred embodiments for the above non-slip processing method of the metal scaffolding board is to form a plurality of coated layer and to apply wet-on-wet to the second or the upper layer, simultaneously with the first layer or separately, a non-polar hot-melt composition consisting essentially of from 20 to 60% by weight of an ethylene-vinyl acetate resin or an ethyleneacrylate ester resin, from 75 to 10% by weight of a tackifier having a softening point of from 80° to 130° C. and from 5 to 30% by weight of a wax.

The present invention will hereinafter be described in detail.

The oiled-face adherable, hot-melt adhesive composition of the invention contains a modified resin component obtained by chemically introducing into the molecule of one or more of the constitutive components in the hot-melt adhesive a functional group represented by the formula (I), that is, a phosphoric acid group having at least one -P-OH bond, phosphorous acid group, phytic acid group or half amine salts of these groups.

That is, the hot-melt adhesive composition contains a modified resin component obtained by chemically introducing the phosphoric acid group into one or more of the components selected from the below described thermoplastic base polymer, tackifier and wax and/or plasticizer; preferably contains a modified resin component obtained by chemically introducing the phosphorous acid group or the phosphoric acid group corresponding to the range of from 0.01 to 20% by weight converted to phosphoric acid; most preferably contains a modified resin component obtained by further introducing a carboxyl or its anhydride group into the same or different molecule of the above component modified with the phosphoric acid group, thereby subjected to coexist two kinds of functional groups.

The fundamental constitution of the hot-melt adhesive composition of the invention is composed of a so-called thermoplastic base polymer, tackifier and wax and/or plasticizer.

The hot-melt adhesive composition of the invention preferably contains the thermoplastic base polymer described below.

The number average molecular weight of the base polymer measured by high-performance liquid chromatography is in the range of from 20,000 to 1,500,000, preferably from 20,000 to 1,000,000 more preferably from 20,000 to 500,000.

The thermoplastic base polymer is preferably compatible with the below described tackifier and wax components. No particular restriction is imposed on the base polymer. Exemplary thermoplastic base polymer includes butyl base rubber, partially crosslinked butyl rubber, polyisobutylene resin, styrene-ethylene-butylene resin, styrene-ethylene-butylene-styrene base block copolymer, styrene-ethylene-propylene base block copolymer, styrene-isoprene-styrene base block copolymer, styrene-butadiene-styrene base copolymer, ethylenepropylene base resin, acrylic rubber, polyester resin, modified high molecular weight polyethylene having a melt index of from 5 to 200 g/10 min at 180° C., ionomer resin, ethylene-acrylate ester copolymer having an acrylate ester content of from 1 to 45% and a melt index of from 0.1 to 750 g/10 min at 180° C., polyamide resin, polyimide resin and polycarbonate resin.

These thermoplastic base polymer are used singly or as a mixture in an amount of from 5 to 45% by weight and preferably used as a mixture of 5 kinds or less.

Combined use of at least 2 kinds of resin selected from butyl rubber, styrene-ethylene-butylene-styrene resin, styrene-ethylene-butylene resin, styreneethylene-propylene-styrene resin, ethylene-propylene resin and ethylene-acrylate ester resin is preferred in view of heat stability and adhesion characteristics.

The above resin can be used for the thermoplastic base polymer to be modified by introducing the phosphoric acid group and, if desired, the carboxyl or its anhydride group into the molecule. Thus modification can be readily carried out and the resultant modified resin component can preferably provides the oil-face, adherable, hot-melt adhesive composition of the invention which has suitable rigidity and toughness and is also excellent in weatherability and heat stability.

In the oiled-face adherable hot-melt adhesive composition of the invention, no particular restriction is placed on the total amount of the thermoplastic base polymer which partially includes the modified base polymer obtained by introducing into the molecule the above phosphoric acid group and, if desired, the carboxylic acid or its anhydride group. The total amount is generally from 5 to 80% by weight, preferably from 20 to 50% by weight. The total amount less than 5% by weight is liable to lack strength in high temperature. On the other hand, the total amount exceeding 80% by weight leads to viscosity increase in the hot-melt adhesive and thereby tends to decrease coating workability and to cause poor wetting properties to the target material for adhesion.

The coiled-face adherable, hot-melt adhesive composition of the invention is required to use the tackifier by the following reason.

The tackifier is very effective for viscosity reduction and wetting property control of the hot-melt adhesive composition of the invention, in other words, for the improvement of workability, adjustment of hot tack and open time control, and hence is important for the exhibition of instant adhesion properties.

Conventionally known tackifiers can be used for the invention. Representative tackifiers include, for example, (hydrogenated)aromatic or aliphatic petroleum resin, terpene base resin, terpene-phenol copolymer resin, (hydrogenated)rosin and (hydrogenated)rosin ester base resin, polymerized rosin, hydrogenated dicyclopentadiene base resin, styrene base resin, coumarone-indene resin, ketone resin, xylene resin, C-5 base petroleum resin obtained by copolymerizing C-5 fraction including pentene, isoprene, piperylene and 1,3-pentadiene which are formed by thermal decomposition of petroleum naphtha, C-9 base petroleum resin obtained by copolymerizing C-9 fraction including indene, vinyltoluene and α- or β-methylstyrene which are formed by thermal decomposition of petroleum naphtha, and a petroleum resin obtained by copolymerization of the above C-5 and C-9 fractions. These tackifiers have an average molecular weight of preferably in the range of from 400 to 3000.

The total amount of the tackifier which contains, if desired, the modified tackifier obtained by introducing the above phosphoric acid group and the carboxyl or its anhydride group into the molecular chain is preferably 80% by weight or less, more preferably from 20 to 60% by weight, most preferably from 20 to 50% by weight of the composition. The tackifier can be used singly or in combination.

When the introduction of the above phosphoric acid group and, if desired, the carboxyl or its anhydride group into the molecular chain is carried out with a graft reaction, a tackifier which gives no adverse effect on the graft reaction is preferably selected. A tackifier which inhibits the reaction by converting active radical to stabilized radical is not used for modification and preferably added after finishing modifications.

Row material resins for the tackifier which are suitable for carrying out the introductions of the above functional groups by grafting in the invention include, for example, hydrogenated petroleum resin, hydrogenated terpene resin, hydrogenated rosin, hydrogenated rosin ester base resin, styrene base resin, ketone resin, xylene resin, hydrogenated C-5 or hydrogenated C-9 base petroleum resin and hydrogenated C-5/C-9 copolymer resin. On the other hand, rosin, rosin ester defivative resin and terpene-phenol copolymer resin which are thought to inhibit grafting are preferably used in a minimum amount.

However, rosin, rosin ester derivative resin and terpene-phenol copolymer resin which have carboxyl groups or hydroxyl groups in the molecule exhibit remarkable effect for improving wetting properties to metals and are preferably added in the final stage of the grafting.

When the above phosphoric acid groups are introduced into the molecular chain of the tackifier by utilizing, for example, phosphorus pentoxide, phosphorus trichloride and phosphorus oxychloride as raw materials for introducing the functional groups, resins having active hydroxyl groups in the molecule are preferably selected for use. No particular restriction is imposed upon the single use of the resin or the combined use of a chemically inactive and unreacted (nonpolar) tackifier as a diluent. When increased generation of side reactions are anticipated in carrying out the above reaction, combined use of an inactive solvent or dilution with the non-reactive tackifier is preferred in order to conduct the reaction under mild conditions.

Wax is used for the hot-melt adhesive composition of the invention. Use of the wax enables viscosity reduction and control of wetting properties, i.e., enhancement of workability, inhibition of blocking, control of open time and remarkable improvement of heat resistance. Thus favorable properties for instant adhesion can be exhibited.

Exemplary wax for use in the invention includes polyethylene base wax, polypropylene base wax, paraffin wax, microcrystalline wax, natural waxes and modified products of these waxes.

The total amount of the wax which contains, if desired, so-called modified wax obtained by introducing the above phosphoric acid group and the carboxylic or its anhydride group into the molecular chain is 30% by weight or less, preferably in the range of from 1 to 20% by weight of the composition. The amount of more than 30% by weight makes open time too short and is liable to lack in workability for adhesion.

Plasticizer can be used for the hot-melt adhesive composition of the invention. Use of the plasticizer can provide suitable rubber elasticity and remarkably improves low temperature adhesion characteristics.

Preferred plasticizers which can be used include a single compound or a mixture of the compound selected from atactic polypropylene, liquid polybutene, polyisobutylene having a molecular weight of from 5,000 to 12,000, paraffin base oil, naphthalene base oil, straight chain fatty acid esters and aromatic polycarboxylic acid ester derivatives.

No particular limitation is placed upon the amount of the plasticizer used. The amount generally depends upon the heat resistance and rigidity of the hot-melt adhesive composition of the invention. The total amount of the plasticizer which contains, if desired, modified plasticizer obtained by introducing the above phosphoric acid group and the carboxyl or its anhydride group into the molecular chain is preferably 50% by weight or less, more preferably from 5 to 30% by weight of the composition in view of the balance of properties such as low temperature adhesion, open time and blocking. Use of the plasticizer exceeding 50% by weight is liable to be too much plasticized and causes problems on rigidity at high temperature.

The oiled-face adherable, hot-melt adhesive composition of the invention can be, if desired, incorporated with the following pigments, fillers, ultraviolet absorbers, ultraviolet stabilizers, antioxidants and aging inhibitors. Representative materials will be illustrated below.

Fillers have a particle size of 100 mesh or less and include, for example, carbon black, talc, clay, silica, barium sulfate, calcium carbonate, barium carbonate, magnesium oxide and titanium oxide. These fillers are generally used for paints and adhesives, and can be used in an amount of 60% by weight or less of the composition in the invention.

Exemplary ultraviolet absorbers which can be used include 2-(5-methyl-2-hydroxyphenyl)benzotriazole, 2-[2-hydroxy-3,5-bis (α,α-dimethylbenzyl)phenyl]-2H-benzotriazole, 2-(3,5-di-tert-butyl-2-hydroxyphenyl) benzotriazole, 2-(3-tert-butyl-5-methyl-2-hydroxyphenyl) -5-chlorobenzotriazole, 2-(3,5-di-tertbutyl-2-hydroxyphenyl)-5-chlorobenzophenol, 2-(3,5-ditert-amyl-2-hydroxyphenyl)benzotriazole and other benzotriazole base compounds; 2-ethoxy-2'-ethyloxazolic acid bisanilide, 2-ethoxy-5-tert-butyl-2'-ethyloxazolic acid bisanilide and other oxazolic acid amide base compounds; and 2,4-hydroxy-4-octoxybenzophenone and other benzophenone base compounds. The ultraviolet absorbers can be used in an amount of from 0.1 to 3% by weight of the compound.

Ultraviolet stabilizers which can be used include, for example, hindered amine compounds such as bis(2,2,6,6-tetramethyl-4-piperazyl)sebacate, bis(1,2,2,6,6-pentamethyl-4-piperidyl)sabacate, dimethyl succinate/1-(2- hydroxyethyl)-4-hydroxy-2,2,6,6-tetramethylpiperidine polycondensate and 1-[2-{3-(3,5-di-tert-butyl-4-hydroxyphenyl) propionyloxy}ethyl]-4-[3-(3,5,-di-tert-butyl-4-hydroxyphenyl)propionyl]-2,2,6,6-tetramethyl piperidine. The ultraviolet stabilizers can be used in an amount of from 0.05 to 3% by weight of the composition.

Representative antioxidants which can be used include, for example, 2,4-bis(n-octylthio)-6-(4-hydroxy-3,5-di-tert-butylanilino)-1,3,5-triazine, pentaerythrityltetrakis[3-(3,5-di-tert-butyl-4-hydroxyphenyl)propionate], 2,2-thiodiethylene bis[3-(3,5-di-tert-butyl-4-hydroxyphenyl)priopionate], octadecyl-3-(3,5-di-tert-butyl-4-hydroxyphenyl)propionate, 2,2-thio-bis(4-methyl-6-tertbutylphenol), N,N'-hexamethylenebis(3,5-di-tert-butyl-4-hydroxy-cinnamide) and other hindered phenol base compounds; and tris(2,4-di-tert-butylphenyl)phosphite, tris(nonylphenyl)phosphite, trinonyl phosphite, tris(2-ethylhexyl)phosphite and other phosphite base compounds. The antioxidants can be used in an amount of from 0.1 to 2% by weight of the composition.

The oiled-face adherable, hot-melt adhesive composition of the present invention comprises the modified resin component obtained by introducing, as a functional group, the phosphoric acid group and, if desired, the carboxyl or its anhydride group into one or more molecular chains selected from the above base polymer tackifier, wax and plasticizer.

Accordingly, suitable raw materials and modification processes for providing the above modified resin components will be described hereinafter.

No particular restriction is put on the ethylenically unsaturated phosphoric acid ester monomer which can be preferably used for introducing the phosphoric acid group into the molecule. The exemplary monomers include (meth)acryloxyalkyl phosphate base monomers such as 2-hydroxy-3-methacryloxypropyl phosphate (another name: and phosphoxypropyl methacrylate), 2-hydroxy-3-methacryloxyethyl phosphate, 2-hydroxy-3-acryloxypropyl phosphate, 2-hydroxy-3-acryloxyethyl phosphate, 2-hydroxy-3-(γ-chloro-β-propylmethacrylate), monoethanolamine salt of acid phosphoxyethyl methacrylate, monoethanolamine salt of acid phosphoxypropyl methacrylate, monoammonium salt of acid phosphoxyethyl methacrylate, and monoammonium salt of acid phosphoxypropyl methacrylate.

The above phosphoric acid ester monomers are reaction products and their half salts of acrylate esters or methacrylate esters such as 2-hydroxyethyl acrylate, 2-hdyroxyethyl methacrylate, 2-hydroxypropyl acrylate and 2-hydroxypropyl methacrylate which have a hydroxyl group in the molecule with phosphorus pentoxide, phosphorus trichloride, pyrophosphoric acid and phosphorus oxychloride.

Addition products and their half salts of phosphoric acid with glycidyl acrylate or glycidyl methacrylate are also preferred monomers such as methacryloyloxyethyl acid phosphate dimethylaminoethyl methacrylate.

Addition products and their half salts of phosphorous acid with glycidyl acrylate or glycidyl methacrylate are further preferred monomers.

Still further preferred monomers are acid phosphoxypolyoxyethylene glycol monomethacrylate and its half salts, acid phosphoxypolyoxypropylene glycol monomethacrylate and its half salts, and associated compounds of acid phosphoxypolyoxypropylene glycol monomethacrylate with methacryloyloxyethyl acid phosphate dimethylaminoethyl methacrylate.

Addition products and their half salts of phytic acid with glycidyl acrylate or glycidyl methacrylate, and vinyl monomers containing an ethylenically unsaturated group and P-OH group, for example, vinylbenzene phosphoric acid are also included in the scope of these monomers.

In the above monomers, particularly preferred monomers for the invention are 2-hydyoxy-3-(meth)acryloxypropyl phosphate, 2-hydroxy-3-(meth)acryloxyethyl phosphate, 2-hydroxy-3-(γ-chloro-β-propyl methacrylate), monoethanolamine salts of acid phosphoxyethyl methacrylate, monoethanolamine salts of acid phosphoxypropyl methacrylate, monoammonium salt of acid phosphoxyethyl methacrylate, monoammonium salt of acid phosphoxypropyl methacrylate, methacryloxyethyl acid phosphate dimethylaminoethyl methacrylate, acid phosphoxypolyoxyethylene glycol monomethacrylate or its half salt, acid phosphoxypolyoxypropylene glycol monomethaclrylate, and associated compounds of acid phosphoxypolyoxypropylene glycol monomethacrylate with methacryloyloxyethyl acid phosphate dimethylaminoethyl methacrylate.

2-Hydroxy-3-(meth)acryloxypropyl phosphate, 2-hydro-3-(meth)acryloxyethyl phosphate and their primary amine addition type half salts are preferred because of ready availability of the market.

In order to introduce the phosphoric acid group in the invention, it is preferred to use an additioncondensation reaction. For example, in a general process, phosphorous pentoxide, phosphorus trichloride, phosphorus oxychloride, phosphorous acid or its half amine salts, and phosphoric acid or its half amine salts are reacted with active hydroxyl group or glycidyloxy group to introduce the phosphoric acid group into the molecule.

In the first process, a prescribed amount of the above ethylenically unsaturated phosphoric acid ester monomer is added to a component or a combination thereof selected from the constitutive components of the above hot-melt adhesive. Grafting of the resultant mixture was carried out in a nitrogen atmosphere under melt-kneading by the addition of a radical generation catalyst.

Conventionally known catalysts can be used for the radical generation catalyst. Preferred catalysts are, for example, organic peroxides, azo base initiators, and photo radical initiators.

The grafting reaction can be carried out in the absence of a solvent, or in the presence of one or more constitutive components of the invention as a diluent or retarder of the reaction, or in the presence of a known solvent having good compatibility with the constitutive components or the modified main materials of the invention and by removing the solvent after finishing the modification. Thus no particular restriction is imposed upon the grafting conditions.

Grafting is carried out generally in the range of from 80° to 200° C., preferably from 100° to 150° C.

In the second process, active hydroxyl groups in the molecule are reacted (addition, condensation) with phosphorus pentoxide, phosphorus trichloride, phosphorus oxychloride or pyrophosphoric acid to introduce the phosphoric acid group into the molecular chain.

This process can also be applied with ease to the constitutive components of the above hot-melt adhesive which have no functional group at all by carrying out pretreatment. One or more of the constitutive components having no polar functional group are previously treated with hydrogen peroxide to introduce active hydroxyl groups in the molecule and then reacted with, for example, phosphorous pentoxide to introduce the phosphoric acid group.

When the constitutive components of the above hot-melt adhesive which already have carboxyl or acid anhydride groups in the molecule are used for the raw material of modification, active hydroxyl groups are previously introduced, for example, by esterifying with a known organic diol compound or by addition of a known mono- or poly-epoxy compound and then the above modification process can be preferably carried out.

In other words, the molecular chain is once converted to an active hydroxyl group in the second process by utilizing various chemical reactions depending upon the kind of functional group in the resin before modification, and then reacted with phosphorus pentachloride to achieve the modification.

The preferred constitutive components of the above hot-melt resin composition which already have hydroxyl groups include, for example, tackifiers such as terpene-phenol copolymer resin, terpene-bisphenol copolymer resin, p-hydroxystyrene copolymer petroleum resin and p-hydroxy-α-methylstyrene copolmer petroleum resin; and plasticizers and waxes such as (hydrogenated) polybutadiene monol, (hydrogenated) polybutadiene diol, (hydrogenated) polyisoprene monol, (hydrogenated) polyisoprene diol and other liquid, low molecular weight, terminal hydroxylated polyolefin resin, oxidized polyethylene wax, oxidized polypropylene wax and oxidized paraffin wax. These components can be readily converted to modified resin components by the second process.

In the third process, glycidyl groups in the molecule is reacted (addition.condensation) with phosphorous acid or its half amine salts, phosphoric acid or its half amine salts, and phytic acid to obtain modified resin.

When the constitutive components of the hot-melt adhesive which have of functional group at all are modified by the third process, the below described pretreatment reaction is previously carried out as conducted in the second process and then glycidyl group is introduced to achieve modification One or more of the constitutive components having no polar functional group are previously grafted with an allylglycidyl ether compound, glycidyl methacrylate or glycidyl acrylate to introduce active glycidyl groups in the molecule and then phosphorous acid or phytic acid is added to achieve modification. Namely, various known chemical reactions are utilized depending upon the kind of functional group in the resin before modification and active glycidyl groups are finally introduced into the molecule to carry out modification.

The reactions in the second and third processes can be carried out in the absence of a solvent, or in the presence of one or more of constitutive components of the invention as a diluent, or in the presence of a known inactive solvent having good compatibility with the constitutive components or the modified main materials of the invention and by removing the solvent after finishing the modification. Thus no particular restriction is placed on conducting the reaction. Addition and condensation reactions are preferably carried out in anhydrous conditions in view of preventing side-reactions.

After finishing the reaction, a prescribed amount of water is generally added to the reaction mixture and the introduced group is finally converted to —P—OH group. When water is contained in the raw materials to be added in the later step, addition of water can be preferably omitted.

The reaction in the second and the third processes is carried out generally in the range of from 20° to 0° C., preferably from 50° to 80° C.

In the phosphoric acid introduction process of the invention using phosphorus trichloride and phosphorus oxychloride, secondary treatments, for example, addition of HCl removing agents to increase heat stability of the resin, HCl elimination under high vacuum to increase heat stability of the resin, and HCl removal by hot water extraction, are also included in the scope of the process.

The term "modified resin having a carboxyl group or its anhydride" [hereinafter referred to as (dehydrated)-carboxyl group] includes a compound obtained by below described processes and a resin which is conventionally available in the market and already contains (dehydrated)carboxyl group as a functional group.

Exemplary resin which is available in the market include maleic anhydride grafted styrene-ethylene-butylene-styrene block copolymer resin and other acid modified thermoplastic base polymer; acid modified polypropylene wax, acid modified polyethylene wax, acid modified paraffin wax and other acid modified waxes; and rosin, partially esterified rosin derivatives, polymerized rosin and other tackifiers.

The process for introducing the (dehydrated) carboxyl group as a functional group includes graft reaction. Representative modifying agents which can be most suitably used for the graft reaction include, for example, maleic acid, maleic anhydride, fumaric acid, itaconic acid, itaconic anhydride, crotonic acid, citraconic acid, citraconic anhdryide, acrylic acid and methacrylic acid. Preferred materials are maleic anhydride, itaconic anhydride, crotonic acid, acrylic acid and methacrylic acid. More preferred materials are maleic anhydride, acrylic acid and methacrylic acid.

The modification process utilizing the grafing reaction of the above unsaturated organic acids can be carried out by the same procedures as graft introduction of the above phosphoric acid group. The process can be conducted by simultaneously using the same radical generating catalyst as described in the first process and a prescribed amount of the above unsaturated organic acid is added in a nitrogen atmosphere under melt-kneading. No particular limitation is put on the selection of temperature, radical generating catalyst (radical initiator) and other reaction conditions.

The graft modification of introducing the above (dehydrated) carboxyl group can be carried out simultaneously, in a multi step or separately with the above grafting of the phosphoric acid group. The present invention is not restricted by the difference of modification process.

The hot-melt adhesive composition of the invention preferably contains the resin component obtained by grafting the above unsaturated organic acid in an amount of 5% by weight or less of the constitutional components. It is also preferred in view of remarkable effect on water resistance and rust prevention of metals to contain one or more tackifiers selected from the group consisting of (hydrogenated) rosin, partially esterified (hydrogenated) rosin derivative and polymerized rosin in the range of from 1 to 40% by weight. The effect on water resistance is not increased even though the amount exceeds 5% by weight. The amount exceeding 40% by weight decreases heat stability. The amount less than 1% by weight has almost no effect. Hence the above range is preferred.

In the hot-melt adhesive composition of the invention, that the constitutive components contain modified resin obtained by introducing the phosphoric acid group into one or more molecular chain, and more preferably that the components simultaneously contain the (dehydrated)carboxyl group, are requirements for exhibiting desired properties of oiled-face adhesive and conducting strong adhesion without preheating.

Such remarkable effect is assumed to result from strong affinity of the phosphoric acid group to metal surface.

The hot-melt adhesive composition of the invention is preferred in conclusion to have low melt viscosity in view of obtaining sufficiently high oiled-face adhesion and good workability in coating operation. Melt viscosity at 200° C. is generally 200,000 cps or less, preferably 100,000 cps or less, most preferably in the range of from 500 to 50,000 cps.

When the hot-melt adhesive composition has good viscosity behavior, i.e., flow property, wetting is rapidly performed on the adherend surface and remarkable effect can be exhibited on the adhesion of a coarse and oiled surface.

The preparation of the composition in the present invention is preferably carried out by using a strong stirr-mixer such as a polymerization vessel or a Banbury type kneader. The grafting reaction or chemical modification under melt-mixing state can be conducted by heating in a nitrogen atmosphere. The modification and the kneading procedures may be conducted separately, in multiple steps or simultaneously. Any procedures can be suitably employed.

In the preferred preparation process of the invention, the phosphoric acid group or the (dehydrated) carboxyl group are respectively introduced in advance by the above processes, the constitutive components of the invention are further added, and successively, if desired, fillers, ultraviolet absorbers, ultraviolet stabilizers, antioxidants (aging inhibitors), surface active agents, pigments and various coupling agents are further added, and the resulting mixture is thoroughly melt-kneaded to obtain the hot-melt adhesive composition of the invention.

No particular restriction is imposed upon the order of formulation and the order of the addition in the modificaltion process. It is preferred to select means which can inhibit deterioration and abnormal phenomenon of effective components.

No particular limitation is placed on the morphology of products prepared by the oiled-face adherable, hot-melt adhesive composition of the invention. For example, films, pellets, blocks, tapes, bars, canned packages and other optional shapes can be employed.

No particular restriction is imposed upon the coating method or the adhesion-sealing method using the hot-melt adhesive composition of the invention. Suitably employed methods are, for example, coating or sealing methods such as bead coating, area coating and spot coating which use various hot-melt applicators, multiple coating.adhesion method, clamping adhesion with hot or cold rolls, clamping adhesion with exclusive jigs, press adhesion and other arbitrary adhesion fixing methods.

EXAMPLE

The present invention will hereinafter be illustrated by way of examples However, scope of the invention is not limited by the specific embodiments. Proportion of each component in the examples is indicated by parts by weight.

Testing materials

The surface-treated steel plates used for the oiled-face adhesion test described in the examples were prepared by the following method.

An SPCC steel plate having a thickness of 0.5 mm and width of 25 mm was submerged in a press oil, taken out and allowed to stand for 10 minutes at a vertical position, followed by submerging in a rust-proof lubrication oil, taken out and allowed to stand for 24 hours at a vertical position to remove excess oil.

Another SPCC steel plate which was already subjected to rust-proof lubricating oil treatment was purchased from a test panel supplier and used as such for the test.

Steel plates such as galvanized sheet iron and SPCC steel plate were submerged in an aqueous emulsion type lubricant containing natural vegetable oil, mineral oil and a glycol derivative as main components, taken out and then water was removed with an air spray gun to obtain a test specimen.

Heat stability test

The heat stability test of the hot-melt adhesive composition in the examples was carried out by charging 100 g of the composition into a 200 ml glass beaker, heating in an oven for a predetermined time and thereafter measuring changes in appearance, viscosity and properties.

Rust-preventing durability test

The rust-preventing durability test of the hot-melt adhesive composition in the examples was carried out by coating on a steel plate in a thickness of about 20 to 30 μm, allowing to stand for a week, followed by giving the coated film a cross-cut to the depth of metal surface at the center of the specimen by using a sharp cutter knife, dipping a lower half of the resulting specimen in city water or in a 4% aqueous sodium chloride solution at 40° C. so as to expose an upper half of the specimen into the air, allowing to stand for 3 days, and taking out to observe rust generation on the metal surface and changes in coated film adhesion

Non-slip processing test

A galvanized sheet iron was drilled at the portion corresponding to the top of a scaffolding board. Under pouring a sufficient amount of coconut-oil-base lubricant on the processing rolls, the perforated sheet iron obtained above was continuously passed through the rolls to process into a shape of the scaffolding board having a section composed of 20 cm in width, 3.5 cm in height of channel type both sides and 2 cm in width of both bottom portions and having a length of 2 m.

Then, turning the scaffolding board upside down, dehydration was carried out by blowing the air at high pressure of 2 to 6 kg/cm². On both edges of the back surface of the scaffolding board which surface was still in an oil-stained state, non slip processing was carried out at a coating line speed of 5 m/min or 15 m/min by using a gear pump type hot-melt application. The hot-melt adhesive composition was continuously applied at a melt temperature of 180° to 200° C. into a width of 13 to 15 mm at a prescribed thickness, at the thickness of 1.5 mm unless otherwise noted.

Non-slip processing of two-layer structure is carried out by using two gear pump type hot-melt applicators fitted with a twin coating nozzle which is composed of two isolated output nozzles and integrated at the tip.

Two hot-melt adhesive resin compositions are individually fed to each output nozzle at temperature of 180° to 200° C. and continuously applied to the same position so as to obtain the first coat having a width of 13 to 15 mm and a thickness of 0.5±0.4 mm and the second coat (top coat) having a width of 13 to 15 mm and a thickness of 0.8±0.5 mm.

EXAMPLE 1

Ethylene-ethyl acrylate resin (hereinafter referred to as EEA) composed of 25% ethyl acrylate copolymer (Trade mark; EVAFLEX EEA A-703, manufactured by Mitsui Du Pont Polychemicals) was used, and 100 parts of the resin was melted at 110° C. in a nitrogen atmosphere and 12 parts of 2-hydroxy-3-methacryloxypropyl phosphate was added and mixed. To the resulting mixture, 0.3 part of dicumyl peroxide was added by three portions and a grafting reaction was carried out.

The reaction rate calculated from residual monomer ratio in the modification reaction was about 95% or more by boiling water extraction or high performance liquid chromatography. According to the results of measurement by high performance liquid chromatography, at least about 50% of the above phosphoric acid acrylate monomer was grafted on the starting material resin.

After finishing modification, 35 parts of the composition thus obtained was mixed with the following thermoplastic polymer tackifier, wax, plasticizer and various additives to obtain a hot-melt adhesive composition; Melt-A as illustrated in Table 1.

| | |
|---|---|
| Styrene-ethylene-butylene-styrene block copolymer resin (SEBS) having 29% styrene content (Trade mark; Kraton G-1652, manufactured by Shell Chemicals) | 10 parts |
| Hydrogenated dicyclopentadiene resin having a softening point of 105° C. (Trade mark, Escorez 5300, manufactured by Tonex) | 30 parts |
| Rosin ester derivative (Trade mark; SUPER ESTER A-115, manufactured by Arakawa Chemical) | 10 parts |
| Acid modified polypropylene wax (PP wax) (Trade mark; Viscol TS-200, manufactured by Sanyo Chemical Industries) | 10 parts |
| Naphthene oil plasticizer | 5 parts |
| Hindered phenol antioxidant (Trade mark; IRGANOX-1010, manufactured by Ciba-Geigy) | 0.25 part |
| Ultraviolet absorber (Trade mark; TINUVIN-P, manufactured by Ciba-Geiby) | 0.25 part |

Thus-obtained hot-melt adhesive composition Melt-A had a melt viscosity of about 15,000 cps at 190° C.

Viscosity change rate after heat stability test at 190° C. for 48 hours was 10% or less. The heat stability was good and abnormality such as skinning was not observed.

EXAMPLE 2

A hot-melt resin composition; Melt-B was prepared by carrying out the same procedures as described in Example 1 except that 2-hydroxy-3-methacryloxypropyl phosphate was replaced by 2-hydroxy-3-methacryloxyethyl hosphate.

Thus-obtained adhesive composition; Melt-B had melt viscosity of 15,000 cps at 190° C. Viscosity change rate after heat stability test at 190° C. for 48 hours was 10% or less. The heat stability was good and abnormality such as skinning was not observed.

EXAMPLE 3

Following materials were mixed and kneaded at 110° C.

| | |
|---|---|
| EEA resin composed of 17% ethyl acrylate copolymer (Trade mark; EVAFLEX A-707, manufactured by Mitsui Du Pont Polychemicals) | 25 parts |
| SEBS having 14% styrene content (Trade mark; Clayton G-1657, manufactured by Shell Chemicals) | 10 parts |
| Tackifier, hydrogenated dicyclopentadiene resin having a softening point of 125° C. (Trade mark; Escorez 5320, manufactured by Tonex) | 30 parts |

To the resulting mixture, 2 parts of 2-hydroxy-3-methacryloxypropyl phosphate was added in a nitrogen atmosphere and thereafter 0.5 part of dicumyl peroxide was added by three portions to carry out a grafting reaction.

The reaction rate calculated from residual monomer ratio in each modification reaction was about 95% or more by boiling water extraction or high performance liquid chromatography.

The modified resin composition thus obtained was mixed with the following tackifier, wax, plasticizer and various additives to obtain a hot-melt adhesive composition; Melt-C as illustrated in Table 1.

| | |
|---|---|
| Rosein ester derivative (Trade mark; SUPER ESTER A-115, manufactured by Arakawa Chemical) | 15 parts |
| Acid modified PP wax (Trade mark; Viscol TS-200, manufactured by Sanyo Chemical Industries) | 12.5 parts |
| Naphthene oil plasticizer | 5 parts |
| Hindered phenol antioxidant (Trade mark; IRGANOX-1010, manufactured by Ciba Geigy) | 0.25 part |
| Ultraviolet absorber (Trade mark; TINUVIN-P, manufactured by Ciba Geigy) | 0.25 part |

Thus-obtained hot-melt adhesive composition; Melt-C had a melt viscosity of about 8000 cps at 190° C.

Viscosity change rate after heat stability test at 190° C. for 48 hours was 10% or less. The heat stability was good and abnormality such as skinning was not observed.

EXAMPLE 4

A hot-melt resin composition; Melt-D was obtained by carrying out the same procedures as described in Example 3 except that 2-hydroxy-3-methacryloxypropyl phosphate was replaced by 2-hydroxy-3-methacryloxyethyl phosphate.

EXAMPLE 5

Following materials were mixed and kneaded at 150° C.

| | |
|---|---|
| EEA composed of 25% ethyl acrylate copolymer (Trade mark; EVAFLEX A-703, manufactured by Mitsui Du Pont Polychemicals) | 20 parts |
| Butyl rubber (Trade mark; BUTYL-365, manufactured by Japan Synthetic Rubber) | 5 parts |
| Mixture of styrene-ethylene-butylene copolymer (SEB) and SEBB which has 28% styrene content (Trade mark; Kraton G-1726X, manufactured by Shell Chemicals) | 10 parts |
| Hydrogenated terpene resin tackifier having softening point of 150° C. (Trade mark; Clearon P-125, manufactured by Yasuhara Chemical) | 40 parts |

To the resulting mixture, 3 parts of ethanolamine half salt of 2-hydroxy-3-methacryloxypropyl phosphate were added and further 0.5 part of 2,5-dimethyl-2,5di(-tert-butylperoxy)cyclohexane was added by three portions and a grafting reaction was carried out.

The modified resin composition thus obtained was mixed with the following tackifier, wax, plasticizer, pigment and various additives to obtain a hot-melt adhesive composition; Melt-E as illustrated in Table 1.

| | |
|---|---|
| Terpene phenol base tackifier (Trade mark; YS-PŌLYSTAR #2130, manufactured by Yasuhara Chemical) | 18 parts |
| Polyethylene wax (PE wax) (Trade mark; NEOWAX-L, manufactured by Yasuhara Chemical) | 3 parts |
| Liquid polybutene plasticizer (Trade mark; HV-300, manufactured by Nippon Petrochemical) | 5 parts |
| Hindered phenol antioxidant (Trade mark; IRGANOX-1706, manufactured by Ciba Geigy) | 0.3 part |
| Tris-nonylphenyl phosphite antioxidant | 0.5 part |
| Ultraviolet absorber (Trade mark; TINUVIN-P, manufactured by Ciba Geigy) | 0.25 part |
| Carbon black | 0.02 part |
| Colloidal silica (Trade mark; AEROSIL #200) | 1.0 part |

Thus-obtained hot-melt adhesive composition; Melt-E had melt viscosity of 25,000 to 27,000 cps at 190° C.

Viscosity change rate after heat stability test at 190° C. for 48 hours was 10% or less. The heat stability was good and abnormality such as skinning was not observed at all.

EXAMPLE 6

A hot-melt resin composition; Melt-F was prepared by carrying out the same procedures as described in Example 5 except that ethanolamine half salt of 2-hydroxy-3-methacryloxypropyl phosphate was replaced by ethanol amine half salt of 2-hydroxy-3-methacryloxyethyl phosphate.

EXAMPLE 7

A hot-melt resin composition; Melt-G was prepared by carrying out the same procedures as described in Example 5 except that ethanolamine half salt of 2-hydroxy-3-methacryloxypropyl phosphate was replaced by acidphosphoxypolyoxyethylene glycol monomethacrylate.

EXAMPLE 8

A hot-melt resin composition; Melt-H was prepared by carrying out the same procedures as described in Example 5 except that ethanolamine half salt of 2-hydroxy-3-methacryloxypropyl phosphate was replaced by acid phosphoxypolyoxypropylene glycol monomethacrylate.

EXAMPLE 9

A solution was prepared by dissolving 100 parts of the same thermoplastic resin EEA as used in Example 1 in 200 parts of a mixture of toluene and n-hexane and heated to 110°. The resulting solution was cooled to 20° C. and 10 parts of 2-hydroxy-3-dimethacryloxypropyl phosphate were added in a nitrogen atmosphere. About 1.0 part of 1,1-bis(tert-butylperoxy)-3,3,5-trimethylcyclohexane was successively added by two portions to carry out a grafting reaction.

After finishing the modification reaction, solvent was completely removed from the reaction mixture by heating under vacuum. The residue was converted to monoethanolamine salt and 25 parts of the modified resin thus obtained were mixed with the following thermoplastic base polymer, tackifier, wax and various additives to obtain a hot-melt adhesive composition; Melt-I as illustrated in Table 1.

| | |
|---|---|
| SEBS having 29% styrene content (Trade mark; Kraton G-1652, manufactured by Shell Chemicals) | 10 parts |
| Hydrogenated C-9 base petroleum resin V (Trade mark; Arcon P-115 manufactured by Arakawa Chemical) | 10 parts |
| Terpene resin (Trade mark; YS-RESIN TO-115, manufactured by Yasuhara Chemical) | 11 parts |
| Hydrogenated C-5/C-9 base petroleum resin (Trade mark; Adomarb S-100, manufactured by Idemitsu Petrochemical) | 10 parts |
| Acid modified PE wax (Trade mark; HIWAX 2203A, manufactured by Mitsui Petrochemicals) | 2 parts |
| PP wax (Trade mark; Viscol 660P, manufactured by Sanyo Chemical Industries) | 15 parts |
| Atactic polypropylene (Trade mark; M-grade, manufactured by Mitsui Toatsu Chemicals) | 10 parts |
| Liquid polybutene (Trade mark; HV-1900, manufactured by Nippon Petrochemical) | 5 parts |
| Butoxytriethylene glycol acid phosphate | 1 part |
| Antioxidant (Trade mark; IRGANOX-1010, manufactured by Ciba Geigy) | 0.5 part |
| Tris-nonylphenyl phosphite antioxidant | 0.5 part |

Thus-obtained hot-melt adhesive composition; Melt-I had a melt viscosity of about 20,000 cps at 180° C.

Viscosity change rate after heat stability test at 190° C. for 48 hours was 10% or less. The heat stability was good and abnormality such as skinning was not observed.

EXAMPLE 10

A hot-melt resin composition; Melt-J was obtained by carrying out the same procedures as described in Example 9 except that 2-hydroxy-3-dimethacryloxypropyl phosphate was replaced by an approximately 1:1 mixture of 2-hydroxy-3-methacryloxyethyl phosphate and 2-hydroxy-3-dimethacryloxyethyl phosphate and the modified product was converted to a monoammonium salt.

EXAMPLE 11

A solution was prepared by dissolving 50 parts of terpene phenol resin (Trade mark; YS Polystar T-130, manufactured by Yasuhara Chemical) and 50 parts of hydrogenated liquid polyisoprene diol having a hydroxyl equivalent of 0.90 mg/g and an average molecular weight of 2,500 (Trade mark; PIP-H, manufactured by Idemitsu Petrochemical) in 200 parts of toluene at 20° C. To the solution obtained, 3.5 parts of phosphorus pentoxide were added by four portions. After finishing the reaction, toluene was removed. To the residue, 0.3 to 0.4 part of water was added to carry out hydrolysis. Thus a modified resin was obtained.

According to the results of measurement by high performance liquid chromatography, at least about 95% of phosphorus pentoxide was grafted on the starting material resin.

After finishing modification, 35 parts of the modified resin were mixed with the following thermoplastic base polymer, tackifier, wax and various additives to obtain a hot-melt adhesive composition; Melt-K as illustrated in Table 1.

| | |
|---|---|
| Styrene-isoprene-styrene resin (SIS) having 14% styrene content (Trade mark; Quintac 3421, manufactured by Nippon zeon) | 20 parts |
| SEBS having 14% styrene content (Trade mark; Kraton G-1657, manufactured by Shell Chemicals) | 10 parts |
| Rosin ester resin (Trade mark; SUPER ESTER A-115, manufactured by Arakawa Chemical) | 25 parts |
| PP wax (Trade Mark; Viscol 660P, manufactured by Sanyo Chemical Industries) | 10 parts |
| Antioxidant (Trade mark; IRGANOX-1010, manufactured by Ciba Geigy) | 0.2 part |
| Tris-nonylphenyl phosphite antioxidant | 0.5 part |

Thus-obtained hot-melt adhesive composition; Melt-K had melt viscosity of about 30,000 cps at 160° C. Viscosity change rate after heat stability test at 160° C. for 48 hours was 25% or less. The heat stability was good and abnormality such as skinning was not observed.

EXAMPLE 12

A hot-melt resin composition; Melt-L was prepared by carrying out the same procedures as described in Example 11 except that phosphorus pentoxide was replaced by 4 parts of phosphorus oxychloride.

EXAMPLE 13

A mixture composed of 60 parts of C5-C9 base hydrogenated petroleum resin tackifier (Trade mark; Admarb S-100, manufactured by Idemitsu Petrochemical), 40 parts of styrene-ethylene-propylene resin (Trade mark; Kraton GX-1701, manufactured by Shell Chemicals) and 3 parts of maleic anhydride was melted and 0.5 part of 2,5-dimethyl-2,5-di(tert-butylperoxy)hexane-3 was added to carry out a grafting reaction.

To 100 parts of the resulting resin composition obtained by introducing an acid anhydride group into the molecule, 1.8 parts of glycidol was added and reacted, and successively 2.5 parts of phosphorus pentoxide was reacted to obtain a modified resin.

Eighty parts of the modified resin was mixed with the following thermoplastic base polymer, wax and various additives to obtain a hot-melt adhesive composition; Melt-M as illustrated in Table 1.

| | |
|---|---|
| SEBS (Trade mark; Taftec H-1051, manufactured by Asahi Chemical Industry) | 5 parts |
| PP wax (Trade mark; Viscol 660-P, manufactured by Sanyo Chemical Industries) | 10 parts |
| Liquid polybutene plasticizer (Trade mark; HV-300, manufactured by Nippon Petrochemical) | 5 parts |
| Antioxidant (Trade mark; IRGANOX-1010, manufactured by Ciba Geigy) | 0.2 part |
| Tris-nonylphenyl phosphite antioxidant | 0.5 part |

Thus-obtained heat-melt adhesive composition; Melt-M had melt viscosity of about 10,000 cps at 180° C.

Viscosity change rate after heat stability test at 180° C. for 48 hours was about 15% or less. The heat stability was good and abnormality such as skinning was not observed.

EXAMPLE 14

A mixture composed of 35 parts of a commercial acid modified SEBS resin grafted with 2% maleic anhydride (Trade mark; Kraton RG-1901X, manufactured by Shell Chemicals) and 65 parts of hydrogenated petroleum resin base tackifier (Trade mark; Escorez 5300) was reacted with 1.1 parts of glycidol and successively reacted with 2.0 parts of phosphorus pentoxide.

After finishing modification, 80 parts of the resulting modified resin was mixed with the following thermoplastic base polymer, wax and various additives to obtain a hot-melt adhesive composition; Melt-N.

| | |
|---|---|
| SEBS (Trade mark; Taftec H-1051, manufactured from Asahi Chemical Industry) | 5 parts |
| PP wax (Trade mark; Viscol 660P, manufactured by Sanyo Chemical Industries) | 10 parts |
| Liquid polybutene plasticizer (Trade mark; HV-300, manufactured by Nippon Petrochemical) | 5 parts |
| Antioxidant (Trade mark; IRGANOX-1010, manufactured by Ciba Geiby) | 0.2 part |
| Tris-nonylphenyl phosphite | 0.5 part |

COMPARATIVE EXAMPLE 1

Thirty five parts of EEA composed of 25% ethyl acrylate copolymer (Trade mark; EVAFLEX A-703, manufactured by Mitsui Du Pont Polychemical) were mixed with the following thermoplastic base polymer, tackifier, wax, plasticizer and various additives to obtain a hot-melt adhesive composition; Melt-1 as illustrated in Table 1.

| | |
|---|---|
| SEBS having 29% styrene content (Trade mark; Kraton G-1652, manufactured by Shell Chemicals) | 10 parts |
| Hydrogenated dicyclopentadiene resin having a softening point of 105° C. (Trade mark; Escolety 5300, manufactured by Tonex) | 45 parts |
| Rosin ester derivative (Trade mark; SUPER ESTER A-115, manufactured by Arakawa Chemical) | 10 parts |

| | |
|---|---|
| -continued | |
| PP wax (Trade mark; Viscol TS-200, manufactured by Sanyo Chemical Industries) | 10 parts |
| Naphthene oil plasticizer | 5 parts |
| Antioxidant (Trade mark; IRGANOX-1010, manufactured by Ciba-Geigy) | 0.25 part |
| Ultraviolet absorber (Trade mark; TINUVIN-P, manufactured by Ciba-Geigy) | 0.25 part |

COMPARATIVE EXAMPLE 2

A hot-melt adhesive composition; Melt-2 was prepared by carrying out the same procedures as described in Example 7 except that EEA (Trade mark, EVA-FLEX, A-703) was replaced by a 1:1 mixture of ethylene-vinyl acetate resin (EVA having 28% vinyl acetate content (Trade mark; EVAFLEX #250) and EVA having 19% vinyl acetate content (Trade mark; EVA-FLEX #450).

COMPARATIVE EXAMPLE 3

A hot-melt adhesive composition; Melt-3 was prepared by carrying out the same procedures as described in Example 7 except that EEA (Trade mark; EVA-FLEX A-703) was replaced by a 1:1 mixture of SIS having 14% styrene content (Trade mark; Califlex TR-1107) and SIS having 21% styrene content (Trade mark; Califlex TR-1111).

COMPARATIVE EXAMPLE 4

A hot-melt adhesive composition; Melt-4 was prepared by carrying out the same procedures as described in Example 7 except that EEA (Trade mark; EVA-FLEX A-703) was replaced by a mixture consisting of 10% of butyl rubber (Trade mark; JSR Butyl #365), 10% of polyisobutylene (Trade mark; VISTANEX L-80, manufactured by Exxon) and 80% of atactic polypropylene having a softening point of 140° C.

TABLE 1

| No. | | Example | | | | | | | | | | | | | | Comp. Example | | | |
|---|---|---|---|---|---|---|---|---|---|---|---|---|---|---|---|---|---|---|---|
| Melt No. | | 1 A | 2 B | 3 C | 4 D | 5 E | 6 F | 7 G | 8 H | 9 I | 10 J | 11 K | 12 L | 13 M | 14 N | 1 1 | 2 2 | 3 3 | 4 4 |
| Condition (1), Between SPCC oiled-face steel adhesion | | | | | | | | | | | | | | | | | | | |
| Tensile shear strength (kg/cm²) | 0° C. | 80 | 77 | 57 | 59 | 15 | 16 | 13 | 13 | 75 | 83 | — | — | 35 | 95 | IP | IP | IP | IP |
| | 20° C. | 41 | 40 | 17 | 16 | 3.8 | 4.0 | 3.3 | 3.3 | 47 | 45 | — | — | 44 | 46 | 3.0 | 2.5 | 20 | 18 |
| | 50° C. | 3.6 | 3.4 | 2.9 | 3.0 | 0.9 | 0.9 | 0.8 | 0.8 | 6.9 | 9.0 | — | — | 4.5 | 6.0 | 0.3 | 0.2 | <0.3 | <0.2 |
| T-peel strength (kg/in) | 0° C. | 18 | 19 | 12 | 13 | 6.1 | 6.4 | 5.9 | 5.8 | 14 | 13 | — | — | 1.0 | 0.6 | <0.1 | <0.1 | <0.1 | <0.1 |
| | 20° C. | 12.5 | 12.3 | 7.1 | 6.8 | 1.2 | 1.3 | 1.0 | 0.9 | 15 | 16 | — | — | 9.0 | 11 | 0 | 0 | 0 | 0 |
| | 50° C. | 3.9 | 3.7 | 2.5 | 2.2 | 0.5 | 0.4 | 0.3 | 0.3 | 4.4 | 4.7 | — | — | 3.1 | 4.1 | <0.1 | <0.1 | <0.1 | <0.1 |
| Condition (2), Oiled SPCC/ aluminum adhesion | | | | | | | | | | | | | | | | | | | |
| Tensile shear strength (kg/cm²) | 20° C. | 89 | 95 | 61 | 62 | 16 | 17 | 14 | 14 | 91 | 88 | 4.8 | 4.5 | 38 | 96 | IP | IP | IP | IP |
| | 20° C. | 47 | 48 | 17 | 18 | 4.1 | 4.3 | 3.5 | 3.4 | 50 | 49 | 1.7 | 1.8 | 47 | 50 | 3.5 | 3.0 | 11 | 8 |
| | 40° C. | 12 | 11 | 6.8 | 7.1 | 1.4 | 1.6 | 1.1 | 1.2 | 20 | 17 | 0.3 | 0.3 | 4.6 | 16 | 1.1 | 1.3 | 3.0 | 2.5 |
| T-peel strength (kg/in) | 0° C. | 20 | 21 | 14 | 15 | 6.3 | 7.0 | 6.0 | 6.1 | 17 | 16 | 3.0 | 3.2 | 1.5 | 7.0 | <0.1 | <0.1 | <0.1 | <0.1 |
| | 20° C. | 13.5 | 13.7 | 9.8 | 8.7 | 1.5 | 1.4 | 1.0 | 1.0 | 16 | 16 | 1.0 | 1.1 | 9.5 | 12 | NG | NG | NG | NG |
| | 40° C. | 4.0 | 4.1 | 3.1 | 3.3 | 0.8 | 0.7 | 0.6 | 0.6 | 4.7 | 5.0 | 0.3 | 0.3 | 3.1 | 4.5 | <0.2 | <0.2 | <0.2 | <0.2 |
| Condition (3), Galvanized iron/ABS adhesion | | | | | | | | | | | | | | | | | | | |
| Tensile shear strength (kg/cm²) | 20° C. | 12.7 | 13.3 | 11.2 | 11.5 | 1.0 | 1.1 | 0.9 | 0.9 | 14.0 | 12.4 | 1.1 | 1.3 | 8.5 | 10 | IP | IP | IP | IP |
| T-peel strength (kg/in) | 40° C. | 4.0 | 3.9 | 3.0 | 3.1 | 0.6 | 0.5 | 0.4 | 0.3 | 4.0 | 4.4 | 0.2 | 0.3 | 2.7 | 4.1 | <0.1 | <0.1 | <0.2 | <0.2 |
| Condition (4), Between oiled stainless steel adhesion | | | | | | | | | | | | | | | | | | | |
| Tensile shear strength (kg/cm²) | 0° C. | 18 | 17 | 9.2 | 11 | 6.1 | 5.5 | 4.9 | 5.8 | 14 | 13 | 2.8 | 2.6 | 1.0 | 6.5 | IP | IP | IP | IP |
| T-peel strength (kg/in) | 20° C. | 12 | 11.7 | 10.7 | 10.5 | 0.9 | 0.8 | 0.7 | 0.8 | 13 | 12.5 | 0.9 | 0.8 | 6.0 | 4.1 | NG | NG | NG | NG |
| Condition (5), Between SPCC steel adhesion | | | | | | | | | | | | | | | | | | | |
| T-peel strength (kg/in) | 20° C. | 13.4 | 13.0 | 7.1 | 7.4 | 1.2 | 1.3 | 1.1 | 1.0 | 15 | 17 | 1.1 | 1.2 | 4.2 | 5.3 | IP | IP | IP | IP |
| Condition (2), oiled SPCC/ PP adhesion | | | | | | | | | | | | | | | | <0.3 | <0.2 | <0.3 | <0.2 |
| Tensile shear strength (kg/cm²) | 0° C. | 77 | 69 | 49 | 45 | 13 | 14 | 11 | 10 | 70 | 79 | 5.0 | 4.4 | 33 | 88 | IP | IP | IP | IP |
| | 20° C. | 36 | 35 | 15 | 15 | 3.6 | 3.6 | 3.5 | 3.6 | 46 | 45 | 1.7 | 1.6 | 45 | 48 | 12 | 11 | 2.8 | 8.0 |
| 90°-peel strength (kg/in) | 0° C. | 17 | 18 | 11 | 13 | 5.8 | 6.0 | 4.8 | 4.9 | 15 | 14 | 3.3 | 3.5 | 0.9 | 6.6 | 1.0 | 0.5 | 0.6 | 0.3 |
| | 20° C. | 11 | 12 | 9.8 | 10 | 0.8 | 0.6 | 0.6 | 0.6 | 11 | 11.5 | 0.8 | 0.7 | 5.4 | 3.9 | NG | NG | NG | NG |
| PP/ABS adhesion | 20° C. | 82 | 79 | 61 | 60 | 17 | 18 | 16 | 15 | 80 | 91 | 4.9 | 5.0 | 45 | 99 | <0.1 | <0.1 | <0.1 | <0.1 |
| PC/Galvanized iron, condition (3) | 0° C. | 74 | 66 | 54 | 52 | 13 | 14 | 12 | 12 | 69 | 74 | 4.0 | 4.6 | 39 | 71 | 88 | 90 | 12 | 15 |
| Tensile shear strength (kg/cm²) SPCC steel plate | | ⊚ | ⊚ | ⊚ | ⊚ | ⊚ | ⊚ | ⊚ | ⊚ | ⊚ | ⊚ | ⊚ | ⊚ | ⊚ | ⊚ | 10 | 13 | 3.0 | 8.5 |
| Warm water corrosion Galvanized sheet iron | | ⊚ | ⊚ | ⊚ | ⊚ | ⊚ | ⊚ | ⊚ | ⊚ | ⊚ | ⊚ | ⊚ | ⊚ | ⊚ | ⊚ | × | × | △ | × |
| Warm water corrosion SPCC steel plate | | ⊚ | ⊚ | ⊚ | ⊚ | ○ | ○ | ⊚ | ⊚ | ⊚ | ⊚ | ⊚ | ⊚ | ○ | ○ | × | × | △ | × |
| Salt water corrosion SPCC steel plate | | ⊚ | ⊚ | ⊚ | ⊚ | ○ | ○ | ⊚ | ⊚ | ⊚ | ⊚ | ⊚ | ⊚ | ○ | ○ | × | × | × | × |
| Salt water corrosion Galvanized sheet iron | | ⊚ | ⊚ | ⊚ | ⊚ | ○ | ○ | ⊚ | ⊚ | ⊚ | ⊚ | ⊚ | ⊚ | ○ | ○ | × | × | × | × |
| PP/Galvanized iron, Condition (3) Adhesion | | 108 | 110 | 113 | 126 | 110 | 104 | 98 | 103 | 117 | 121 | 97 | 96 | 123 | 118 | <10 | <5 | △ | × |
| Warm water immersion 40° C. × 5 days, Shear strength retention (%) | | 110 | 98 | 124 | 128 | 108 | 106 | 107 | 110 | 122 | 130 | 101 | 106 | 110 | 103 | <5 | <5 | <10 | <5 |
| Condition (2), SPCC/PP Adhesion, 40° C. × RH 95%, 10 days Shear strength retention (%) | | | | | | | | | | | | | | | | | | <20 | <5 |

Remarks on Table 1

Tensile shear test was conducted at a crosshead speed of 25 mm/min. T-peel and 90°-peel test were conducted at a crosshead speed of 50 mm/min.

Preparation conditions of adhered specimen

Using a hand-gun for fusing the melt sample at 180°–200° C., the Melt sample was coated on one side of a metal specimen, another specimen was immediately placed on the coated portion, and clamped for 2–10 seconds to complete adhesion. Adhesive thickness was adjusted to 50–150 μm. In the case of melt-A, B, 1 and 2 which have a relatively short open time of 10 seconds or less, metal specimens for the test were previously warmed to 50°–60° C. in order to suitably carry out adhesion by hand method. On the other hand, when adhesion was carried out without warming under open time of 2–3 seconds, the adhesion strength exhibited at least 75% of the value illustrated in Table 1. The adhesion strength increased with passage of time. Consequently, previous warming is optional and does not limit the invention.

Description of characters

Condition (1) ... Submerging treatment is press oil and rust proof lubricant.
Condition (2) ... Submerging treatment in an emulsion type lubricant primarily containing mineral oil.
Condition (3) ... Submerging treatment in an emulsion type lubricant primarily containing vegetable oil.
Condition (4) ... Spray coating treatment with rust proof lubricant 5-56 (manufactured by Kure Industry), allowing to stand for 1 day and wiping off excess oil.
Condition (5) ... Intact oil-treated specimen purchased from Nippon Test Panel.
PP ... Polypropylene plate 25×75×5 mm in dimension.
PC ... Polycarbonate plate 25×75×5 mm in dimension.
Shear strength retention (%) ...

$$\frac{\text{Shear strength after aging}}{\text{Shear strength before test}} \times 100$$
(measured at 20° C.)

NG ... Specimen was peeled before measurement.
IP ... Complete interfacial peeling on the metal surface.

Corrosion test

◉ ... Rust was found only on the metal-exposed portion, and no rust was observed on the film-coated portion.
○ ... Rust was found within about 1 mm in the vicinity of crosscut, and no blister or separation was observed on other coated surface.
Δ ... Rust and separation were found within about 5 mm in the vicinity of crosscut, or coated film was partly lifted or separated and rust was observed.
X ... Coated film was wholly separated, or rust was observed on metal exposed portion and overall film-separated portion.

Effect

As clearly seen in Table 1, the hot-melt adhesive compositions in comparative examples exhibited very low adhesive strength or incomplete adhesion, low T-peel strength in particular, and caused interfacial peeling on the metal surface, in all cases, without exerting oiled-face adhesion. These results illustrated very large effect of oil.

These phenomenons are reasonably considered that the oil existing on the metal surface extremely inhibits required property for adhesion, that is, wettability or affinity of the adhesive composition to the metal surface.

Comparative examples also led to severe decrease in strength in aging test and practical use of these compositions were thought to be difficult.

On the other hand, the oiled-face adherable, hot-melt adhesive composition of the invention has proved to exhibit excellent oiled-face adhesion as seen in the examples illustrated in Table 1.

The oiled-face adherable, hot-melt resin compositions, Melt A to Melt N, in the invention increased their adhesive strength after aging due to curing effect.

The oiled-face adherable hot-melt resin composition was simultaneously found to have a remarkable effect on rust proof. No development of rust was observed particularly in the immersion into warm water or salt water.

The hot-melt adhesive compositions described in examples 1–5 had an open time of from 15 to 30 seconds and a setting time of about 15 seconds or less to perform complete adhesion. Thus high workability and productivity has been confirmed.

That is, the novel hot-melt resin composition obtained by introducing the phosphoric acid group or a combination of the phosphoric acid group and the (dehydrated) carboxyl group into one or more molecular chains in the constitutive components of the hot-melt adhesive composition can provide the following characteristics.

It has been found to provide a quite novel characteristic for adhering an oil-stained metal surface in addition to instant adhesion freedom from pollution and heat stability for a long time which are characteristics of the hot melt resin composition. Further, adhesion to plastics which are difficult to adhere and rust inhibiting property have also been exhibited.

Consequently, the present invention provides a novel and highly reliable hot-melt adhesive composition which retains instant adhesion and freedom from pollution, has excellent adhesion to oiled surface and dominant rust proof property, and is most suitable for use in adhesion and seal of metals with various plastics and other materials. The adhesive composition can be preferably used for adhesion of metals with each other, plastics with each other, lamination or adhesion and sealing of various plastics and metals, metal protective coating, non-slip treatment on metal surface and adhesion of metals with different materials.

EXAMPLE 15

Melt-A obtained in Example 1 was applied by one layer hot-melt method to an untreated scaffolding board so as to obtain an average film thickness of 1.5 mm. This is referred to as Example 15-1.

Another non-slip treated scaffolding board was obtained by conducting the same procedures as carried out in Example 15-1 except that Melt-A was replaced by Melt-B obtained in Example 2. This is referred to as Example 15-2.

The non-slip properties of the scaffolding boards obtained in Examples 15-1 and 15-2 were measured in accordance with JIS K-7204. After 1000 rotations of truck wheel No. CS-17 under 1 kg load, abrasion wear was 10 mg or less and almost no abrasion was observed.

The sliding friction test at room temperature in accordance with ASTM D-1894-63 exhibited a sliding angle of 50 to 55 degrees which was a good anti-slip property.

The non-slip treated board obtained in Example 15-1 was allowed to stand at 35° C. under pressure of 0.5 kg/cm² for 3 days to observe blocking property. After the test, little blocking was found and there was quite no problem for actual use.

A small piece was cut out from the coated portion of the non-slip treated scaffolding board and submerged in warm water at 40° C. for 10 days. The adhesive strength of the coated film increased after immersion.

Adhesion of the non-slip coated film of the scaffolding boards obtained in Examples 15-1 and 15-2 were satisfactory for practical use.

EXAMPLE 16

Melt-A obtained in Example 1 and Melt-5 obtained by below described process were applied for coating an untreated scaffolding board. Melt-A was directly applied to the board as a primary layer with a thickness of 0.5 mm. Melt-5 was applied to form a top a top layer with a thickness of about 0.8 mm. Wet-on-wet coating was carried out through a complex nozzle-die at a line speed of 15 m/min by using two hot-melt applicators.

The above hot-melt resin composition; Melt-5 has the following composition.

| | |
|---|---|
| Ethylene-vinyl acetate resin having 19% vinyl acetate content (Trade mark; EVAFLEX #450, manufactured by Mitsui Du Pont Polychemicals) | 30 parts |
| Sytrene-butadiene-styrene resin having 30% styrene content (Trade mark; Califlex TR-1101, manufactured by Shell Chemicals) | 5 parts |
| Rosin ester resin (Trade mark; SUPER ESTER A-115, manufactured by Arakawa Chemical) | 25 parts |
| Hydrogenated dicyclopentadiene resin (Trade mark; Escorez 5300, manufactured by Tonex) | 20 parts |
| PE wax (Trade mark; NEOWAX-L, manufactured by Yasuhara Chemical) | 19.8 parts |
| Antioxidant (Trade mark; IRGANOX-1010, manufactured by Ciba Geigy) | 0.2 part |

Non-slip property was measured on the next day.

After 1000 rotations in the non-slip property test, abrasion wear was about 50 mg or less and a sliding angle of 40 to 45 degrees was obtained in the sliding friction test. Good anti-slip properties were obtained.

The non-slip treated scaffolding board was allowed to stand at 40° C. under pressure of 1.5 kg/cm² for 3 days and blocking property was observed. Blocking was little and no problem was found for actual use. Blocking indicated by separation strength was 0.15 kg per 30 cm length of the scaffolding board.

The T-peel strength of the double-layer film composed of Melt-A and Melt-5 was 7.5 kg/in or more at 20° C., and 2.8 kg/in or more at 50° C.

A test piece of 15 cm in length was cut out from the non-slip treated scaffolding board and submerged in warm water at 40° C. for 10 days. The adhesive strength of the coated film increased after immersion. Thus adhesion the non-slip layer of the scaffolding board was satisfactory for practical use.

COMPARATIVE EXAMPLE 5

EEA composed of 25% ethyl acrylate copolymer (Trade mark; EVAFLEX A-703, manufactured by Mitsui Du Pont Polychemicals) was used and 35 parts of EEA were mixed with the following thermoplastic base polymer, tackifier, wax, plasticizer and other additives to prepare a hot-melt adhesive composition; Melt-6.

| | |
|---|---|
| SEBS having 29% styrene content (Trade mark; Kraton G-1652, manufactured by Shell Chemicals) | 10 parts |
| Hydrogenated dicyclopentadiene resin having a softening point of 105° C. (Trade mark; Escorez 5300, manufactured by Tonex) | 45 parts |
| Rosin ester derivative (Trade mark; SUPER ESTER A-115, manufactured by Arakawa Chemical) | 10 parts |
| PP wax (Trade mark; Viscol TS-200, manufactured by Sanyo Chemical Industries) | 10 parts |
| Naphthene oil plasticizer | 5 parts |
| Antioxidant (Trade mark; IRGANOX-1010, manufactured by Ciba Geigy) | 0.25 part |
| Ultraviolet absorber (Trade mark; TINUVIN-P, manufactured by Ciba Geigy) | 0.25 parts |

Thus-obtained hot-melt adhesive composition; Melt-6 was applied one layer to a metal scaffolding board so as to obtain a thickness of 1.2 mm and non-slip property was measured next day. The coated film was lifted and could be readily peeled with fingers. No adhesion was found at all and favorable non-slip property was not exhibited.

The above untreated metal scaffolding board was pretreated with a gas flame to carry out degreasing and preheating. Melt-6 was applied one layer to the board at the metal surface temperature of 200 to 270° C. so as to obtain an average thickness of 1.3 mm. The applied board was immediately cooled with water. The obtained board was subjected to property measurement next day.

The treated scaffolding board was allowed to stand at 35° C. under pressure of 1.5 kg/cm² for 3 days. Blocking was little and no problem was found for practical use.

However, 90 degrees peel strength of Melt-6 was 4.5 kg/in in average at 20° C. and caused severe decrease after submerging in warm water at 40° C. for 10 days. Most of the coated film was readily peeled with fingers. Thus treated scaffolding board was lacking in reliability for practical use.

What is claimed is:

1. An oiled-face adherable, hot-melt adhesive composition having constitutive components comprising a thermoplastic base polymer, tackifier and one or more of additives selected from the group consisting of waxes and plasticizers, one or more of molecular chains in said constitutive components comprising a modified resin component obtained by introducing into a molecular chain a functional group represented by the formula (I):

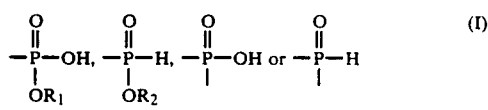

wherein $R_1$ is a hydrogen atom, an alkyl group having from 1 to 8 carbon atoms,

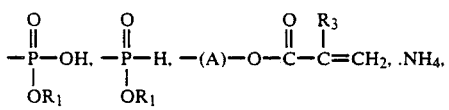

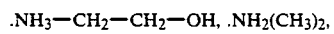

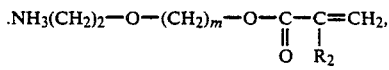

or 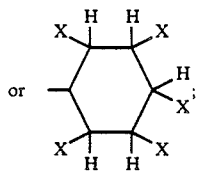

$R_2$ is a hydrogen atom, methyl group, $\cdot NH_4$ or $NH_3-CH_2-CH_2OH$; $R_3$ is a hydrogen atom or a methyl group; A is

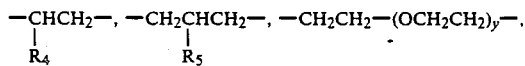

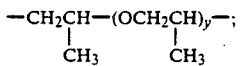

m is an integer of 2 or 3; $R_4$ is a hydrogen atom or a methyl group; $R_5$ is a hydrogen atom, a methyl group, hydroxymethyl group or a chloromethyl group; X is $-P-(OH)_2$; and Y is an integer of from 1 to 15.

2. The hot-melt adhesive composition of claim 1 wherein one or more of the molecular chain in the constitutive components comprises in the same or different molecular chain the phosphoric acid group represented by the formula (I) in claim 1 or an half amine salt of the same and further one or more functional groups selected from —COOH or

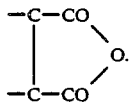

3. The adhesive composition of claim 2 wherein the constitutive components comprise a modified resin component obtained by grafting an unsaturated carboxylic acid or an unsaturated carboxylic acid anhydride in an amount of 5% by weight or less.

4. The adhesive composition of claim 1 wherein the tackifier comprises one or more materials selected from the group consisting of hydrogenated rosin, hydrogenated rosin ester derivative and polymerized rosin in an amount of from 1 to 40% by weight.

5. The adhesive resin composition of claim 1 wherein the constitutive components comprise a modified resin component obtained by grafting from 0.1 to 20 parts by weight of a compound selected from 2-hydroxy-3-(meth)acryloxypropyl phosphate, 2-hydroxy-3-(meth)a- cryloxyethyl phosphate or an half amine salt of the same into 100 parts by weight of the constitutive components.

6. The adhesive composition of claim 1 wherein the constitutive components comprise a modified resin component obtained by reacting a resin component having a hydroxyl group with an agent selected from the group consisting of phosphorus pentoxide, phosphorus trichloride and phosphorus oxychloride, and hydrolyzing the resultant intermediate.

7. The adhesive composition of claim 1 wherein the constitutive components comprise a modified resin component obtained by introducing a glycidyl group into the constitutive components and successively reacting with phosphorous acid or phosphoric acid.

8. The adhesive composition of claim 1 wherein the constitutive components comprise one or more of thermoplastic resin having a molecular weight in the range of from 20,000 to 1,000,000 and selected from the group consisting of styrene-ethylene-butylene-styrene resin, styrene-ethylene-butylene resin, styrene-ethylenepropylene-styrene resin, ethylene-propylene resin, and ethylene-acrylate ester resin; and the thermoplastic resin previously comprises one or both of the modified resin components obtained by (A) grafting from 1 to 20 parts by weight of a compound selected from the group consisting of 2-hydroxy-3-(meth)acryloxypropyl phosphate, 2-hydroxy-3-(-meth)acryloxyethyl phosphate and an half amine salt of the same upon 100 parts by weight of the thermoplastic resin, or by (B) grafting from 0.1 to 5 parts by weight of a monomer selected from maleic anhydride, acrylic acid and methacrylic acid.

9. The adhesive composition of claim 1 wherein the constitutive components are composed of:
 (a) from 5 to 80% by weight of two or more of thermoplastic resin having a molecular weight of from 20,000 to 1,000,000 and selected from the group consisting of butyl rubber, polyisobutylene, styrene-butadiene-styrene resin, styrene-isoprene-styrene resin, styrene-ethylene-butylene styrene resin, styrene-ethylene-butylene resin, styreneethylene-propylene-styrene resin, ethylene-propylene resin, ethylene-vinyl acetate resin and ethylene-acrylate ester resin,
 (b) from 20 to 60% by weight of one or more of tackifier selected from the group consisting of a hydrogenated terpene base resin, hydrogenated petroleum resin, hydrogenated alicyclic base petroleum resin and a rosin ester derivative resin,
 (c) from 1 to 20% by weight of one or more of wax selected from the group consisting of paraffin base wax, polyethylene base wax, polypropylene base wax and modified waxes thereof, and
 (d) from 0 to 30% by weight of one or more of plasticizer selected from the group consisting of liquid polybutene, liquid hydrogenated polyisoprene and atactic polypropylene; and said constitutive components comprise a modified resin component obtained by grafting from 1 to 20 parts by weight of 2-hydroxy-3-(meth)acryloxypropyl phosphate or 2-hydroxy-3-(meth)acryloxyethyl phosphate upon 100 parts by weight of the sum of the thermoplastic resin and one or more of other constitutive components.

10. A non-slip processing method of a metal scaffolding board comprising conducting hot-melt coating of an oiled-face adherable, hot-melt adhesive composition of claim 1 on the back surface of the metal scaffolding board without surface treatment in a width of from 5 to 30 mm.

11. A non-slip processing method of claim 10 wherein the hot-melt coating is carried out to form a plurality of coated layer and to apply wet-on-wet to the second or the upper layer, simultaneously with the first layer or separately, a non polar hot-melt composition consisting essentially of from 20 to 60% by weight of an ethylenevinyl acetate resin or an ethylene-acrylate ester resin, from 75 to 10% by weight of a tackifier having a softening point temperature of from 80° to 130° C. and from 5 to 30% by weight of a wax having a melting point temperature of from 100° to 150° C.

* * * * *